(12) United States Patent
Boydstun et al.

(10) Patent No.: US 8,042,160 B1
(45) Date of Patent: Oct. 18, 2011

(54) IDENTITY MANAGEMENT FOR APPLICATION ACCESS

(75) Inventors: Kenneth C. Boydstun, Frisco, TX (US);
Stephen W. Grimm, Lee's Summit, MO (US); Steven R. Hentzen, Leawood, KS (US); Stephen M. Peters, Pleasant Hill, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1090 days.

(21) Appl. No.: 11/473,184

(22) Filed: Jun. 22, 2006

(51) Int. Cl.
*G06F 7/04* (2006.01)
*G06F 7/00* (2006.01)

(52) U.S. Cl. ............................. 726/6; 707/803

(58) Field of Classification Search ................ 726/6, 18; 709/217, 218; 707/9
See application file for complete search history.

(56) References Cited

U.S. PATENT DOCUMENTS

| | | | | |
|---|---|---|---|---|
| 5,694,595 | A * | 12/1997 | Jacobs et al. ......................... 1/1 |
| 6,115,040 | A * | 9/2000 | Bladow et al. ................. 715/741 |
| 6,237,031 | B1 * | 5/2001 | Knauerhase et al. .......... 709/221 |
| 6,310,949 | B1 * | 10/2001 | Taylor et al. ................... 379/219 |
| 6,460,141 | B1 * | 10/2002 | Olden ............................... 726/4 |
| 6,587,836 | B1 * | 7/2003 | Ahlberg et al. ................ 705/26 |
| 6,598,167 | B2 * | 7/2003 | Devine et al. ..................... 726/8 |
| 6,606,708 | B1 * | 8/2003 | Devine et al. ..................... 726/8 |
| 6,934,848 | B1 * | 8/2005 | King et al. ..................... 713/182 |
| 7,039,714 | B1 * | 5/2006 | Blakley, III et al. ........... 709/229 |
| 7,185,364 | B2 * | 2/2007 | Knouse et al. ..................... 726/8 |
| 7,210,167 | B2 * | 4/2007 | Brezak et al. ................... 726/18 |
| 7,254,831 | B2 * | 8/2007 | Saunders et al. .................... 726/8 |
| 7,398,311 | B2 * | 7/2008 | Joshi et al. ..................... 709/225 |
| 7,441,263 | B1 * | 10/2008 | Bakshi et al. ....................... 726/2 |
| 7,496,954 | B1 * | 2/2009 | Himawan et al. .................. 726/8 |
| 7,506,162 | B1 * | 3/2009 | Hsu et al. ....................... 713/168 |
| 2002/0091639 | A1 | 7/2002 | Mandahl et al. |
| 2002/0112083 | A1 * | 8/2002 | Joshi et al. ..................... 709/248 |
| 2002/0138763 | A1 * | 9/2002 | Delany et al. .................. 713/201 |
| 2003/0065940 | A1 * | 4/2003 | Brezak et al. .................. 713/201 |
| 2004/0260942 | A1 * | 12/2004 | Jamieson et al. ............... 713/201 |
| 2005/0010547 | A1 * | 1/2005 | Carinci et al. ..................... 707/1 |
| 2007/0143829 | A1 * | 6/2007 | Hinton et al. ...................... 726/5 |

OTHER PUBLICATIONS

Allababidi, Mouaz, Patent Application entitled, "Integrated User Profile Administration Tool," filed Apr. 13, 2006, U.S. Appl. No. 11/403,619.
Citrix Systems, Citrix MetaFrame Password Manager, Apr. 22, 2004, (1 pg.).
Boydstun, Ken, Security Framework Bridge, filed Oct. 31, 2002, U.S. Appl. No. 10/284,680, Specifiaiton (45 pgs.), Drawings (3 sheets).

(Continued)

*Primary Examiner* — Nathan Flynn
*Assistant Examiner* — Abdullah Almamun

(57) ABSTRACT

A computer implemented method of identity management for application access. The method includes identifying access enabling information for users. The access enabling information related to users of a first enterprise network to enable the users to access applications on a second enterprise network. The method includes obtaining the identified access enabling information from the first enterprise network, and storing the access enabling information in an identity data store. The method also includes provisioning the access enabling information from the identity data store to one or more applications on the second enterprise network to enable the users of the first enterprise network to access the one or more applications on the second enterprise network.

18 Claims, 4 Drawing Sheets

OTHER PUBLICATIONS

Boydstun, Kenneth C., et al., Business-to-Business Security Integration, filed Jul. 31, 2003, U.S. Appl. No. 10/631,984, Specification (29 pgs.), Drawings (3 sheets).

Balasubramanian, Balagurunathan, et al., Call Center Dashborad, filed Oct. 7, 2004, U.S. Appl. No. 10/960,535, Specificaiton (42 pgs.), Drawings (13 sheets).

Himawan, Rudi, et al., Single Sign-On System and Method, filed Nov. 22, 2004, U.S. Appl. No. 10.994,997, Specification (33 pgs.), Drawings 3 sheets).

Boydstun, Kenneth C., Identity Management System and Method, filed Jun. 10, 2005, U.S. Appl. No. 11/149,923, Specification (24 pgs.), Drawings (3 sheets).

* cited by examiner

IDENTITY MANAGEMENT FOR APPLICATION ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When businesses merge, the process of integrating the systems, applications and employees of the businesses is complex and time consuming. Often, the time to build new systems or conduct complete integration is not available at the time of the merger. However, the newly merged company still requires its new workforce to have immediate access to systems that were previously unavailable to them. In addition, the systems from one enterprise network may have been built to expect a completely different type of user and/or user data than what is provided by the other enterprise network. This makes it necessary to develop a process that quickly enables user access to systems that do not yet have integrated user provisioning, but does not make future integration more difficult. In these situations, identity management can be used to provide application access for users of applications on the first enterprise network to access applications on the second enterprise network, and visa versa.

SUMMARY

In one embodiment, a computer implemented method is provided for identity management for application access. The method includes identifying access enabling information for users. The access enabling information related to users of a first enterprise network to enable the users to access applications on a second enterprise network. The method includes obtaining the identified access enabling information from the first enterprise network, and storing the access enabling information in an identity data store. The method also includes provisioning the access enabling information from the identity data store to one or more applications on the second enterprise network to enable the users of the first enterprise network to access the one or more applications on the second enterprise network.

In another embodiment, a system of identity management for application access is provided. The system includes a first enterprise network having a plurality of applications, a second enterprise network having a plurality of applications, and an identity data store. The system also includes an information manager that is operable to obtain access enabling information for users. The access enabling information is related to users of the first enterprise network to enable the users to access applications on the second enterprise network. The information manager stores the access enabling information in the identity data store. The information manager also promotes provisioning the access enabling information from the identity data store to at least some of the applications on the second enterprise network to enable the users of the first enterprise network to access the at least some applications on the second enterprise network.

In yet another embodiment, a computer implemented method is provided for identity management for application access. The method includes identifying access enabling information for users on a first enterprise network to access applications on a second enterprise network. The method includes obtaining the identified access enabling information from the first enterprise network, and storing the obtained access enabling information in an identity data store. The method provides for provisioning the access enabling information from the identity data store to the applications on the second enterprise network to provide users access to the applications on the second enterprise network. The method includes obtaining a history for users from a first enterprise network data store, and obtaining a history for users from the identity data store. The method also includes combining the obtained history for users from the first enterprise network data store with the obtained history for users from the identity data store to form a combined history for users. The combined history for users is stored in a second enterprise network data store.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
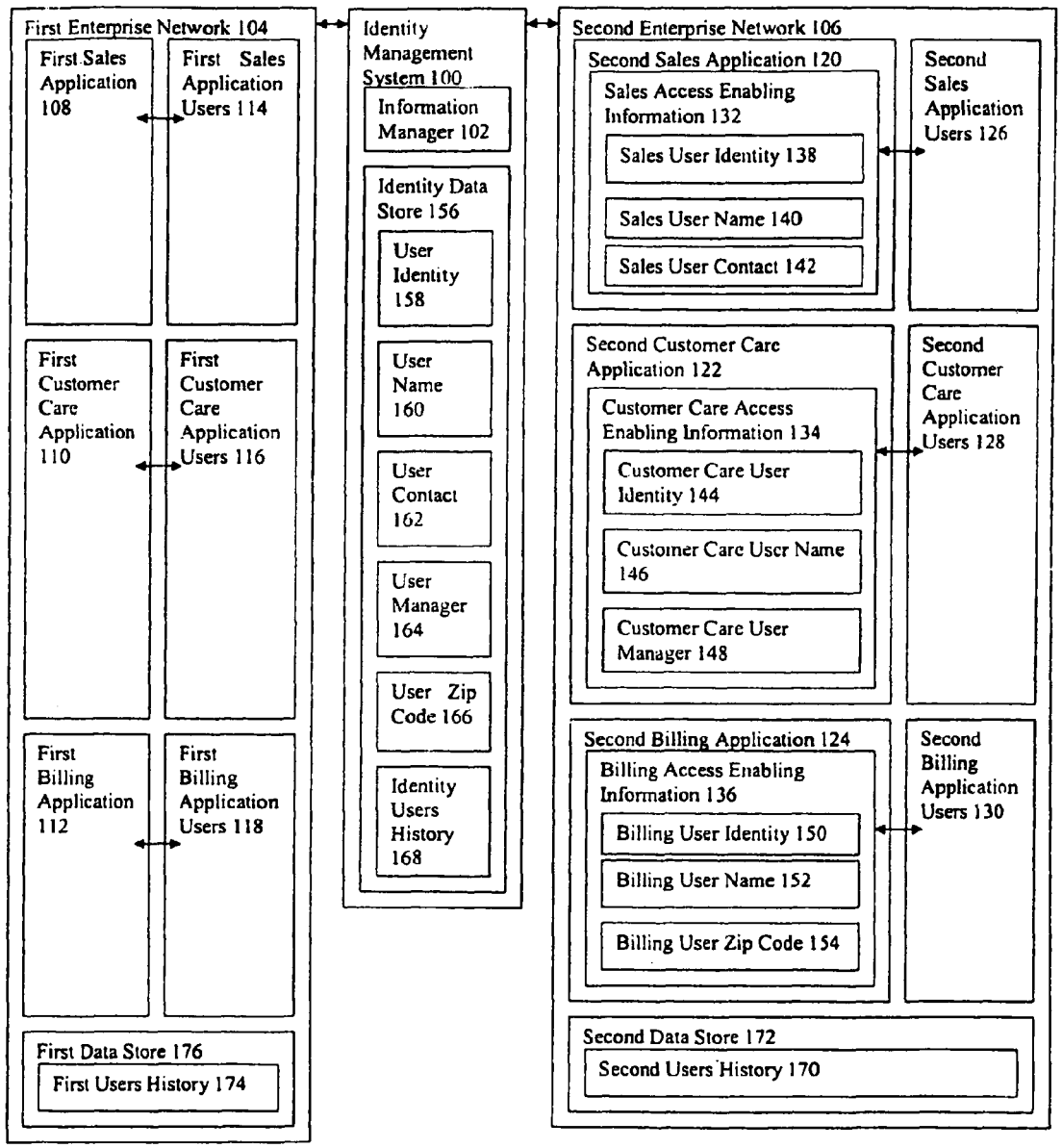
FIG. 1 is a block diagram of a first enterprise network, a second enterprise network, and an identity management system according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

When large businesses merge, the process of integrating their networks is complex and time consuming. When two networks are being merged, some of the users of the first network may need to use some of the software applications of the second network. These users may need to use access information, such as user ID's and passwords, to use each of the applications. Some of the access information may be common for each of the applications. Handling this access information may be confusing and result in duplications if the second network assigns the management of this access information to each manager for each of the applications and each manager for each of the users. For example, if one user needs to use fifty different applications on the second network, and the access information is the same for many of these applications, one or more managers may collect the same access information fifty different times.

Embodiments of the present disclosure provide a method to collect access information that enables each of the users to use any of the applications. Generally, this method provides for a one-time collection of the required access information for every user to use the application(s). This method eliminates the handling of access information that is confusing and results in duplications.

Another problem for merging networks occurs when loading access information for user of a first network into the second network. Loading access information for each user one at a time is time consuming and highly inefficient for networks with a large number of users. Loading the access information for multiple users at once may trigger automated responses in the second network. The automated responses are typically designed to assist the enterprise in setting up and managing new employees and users with human resource, facilities, equipment and supplies, or other systems or information. For example, the second network may automatically respond to the loading of access information for multiple users by assigning new cubicles or a new telephone numbers for each user. This automated response treats each user like a new employee even though these users were already employees of the first network, employees who already had cubicles and telephone numbers. Embodiments of the present disclosure provide an information manager that enables bypassing these automated responses.

Another network merger problem involves historical data. The history of the users using the first network's applications may be stored on the first network, while the history of the users using the applications of the second network may be stored on the second network. When the networks are completely merged, moving the history of the users from the first network to the second network may overwrite the history of the users on the second network.

Embodiments of the present disclosure provide an identity data store that may temporarily store the history of the first network users using the applications of the second network. Subsequently, the history of the users on the first network may then be easily combined with the history of the users using the second network that was stored in the identity data store. Then this combined history may be stored on the second network without overwriting any history.

Turning now to FIG. 1, an identity management system 100 for application access is depicted. Identity management manages the identities and relationship of data as well as people. An application is a software program, or programs, designed to perform a specific task or group of tasks. Application access is the system or process of enabling a user to use the application. The identity management system 100 includes an information manager 102. The information manager 102 is a component that manages the process of enabling users to use the applications, such as by enabling users of a first enterprise network 104 to access applications on a second enterprise network 106, such as when enterprises merge and the information technology systems are being integrated. The information manager 102 may obtain access enabling information, which is any data needed or used to enable a user to use an application. While FIG. 1 depicts the identity management system 100 as external to the second enterprise network 106, the second enterprise network 106 may include the identity management system 100. Similarly, the information manager 102 may be external or internal to the first enterprise network 104.

FIG. 1 depicts three applications in the first enterprise network 104 for the purpose of an illustrative example only, as the first enterprise network 104 may include any number of applications. The first enterprise network 104 may include a first sales application 108, a first customer care application 110, and a first billing application 112. FIG. 1 depicts three sets of users in the first enterprise network 104 for the purpose of an illustrative example only, as the first enterprise network 104 may include any number of sets of users. The first enterprise network 104 may include first sales application users 114, first customer care application users 116, and first billing application users 118. The first sales application users 114 may access the first sales application 108, the first customer care application users 116 may access the first customer care application 110, and the first billing application users 118 may access the first billing application 112.

Similarly, FIG. 1 depicts three applications in the second enterprise network 106 for the purpose of an illustrative example only, as the second enterprise network 106 may include any number of applications. The second enterprise network 106 may include a second sales application 120, a second customer care application 122, and a second billing application 124. FIG. 1 depicts three sets of users in the second enterprise network 106 for the purpose of an illustrative example only, as the second enterprise network 106 may include any number of sets of users. The second enterprise network 106 may include second sales application users 126, second customer care application users 128, and second billing application users 130. The second sales application users 126 may access the second sales application 120, the second customer care application users 128 may access the second customer care application 122, and the second billing application users 130 may access the second billing application 124.

The first enterprise network 104 may merge with the second enterprise network 106. Alternatively, the second enterprise network 106 may utilize users of the first enterprise network 104 as contractors, or outsource work to users of the first enterprise network 104. In any of these or other situations, users of the first enterprise network 104 need access to applications on the second enterprise network 106.

Each application on the second enterprise network 106 is associated with access enabling information. For example, the second sales application 120 may be associated with sales enabling information 132, the second customer care application 122 may be associated with customer care access enabling information 134, and the second billing application 124 may be associated with billing access enabling information 136. The types of access enabling information for any application may be similar to or different from the types of access enabling information for any other application.

FIG. 1 depicts three types of access enabling information associated with each application for the purpose of an illustrative example only, as each application may be associated with any number of types of access enabling information. For example, the sales access enabling information 132 may include a sales user identity 138, a sales user name 140, and a sales user contact 142. In another example, the customer care access enabling information 134 may include a customer care user identity 144, a customer care user name 146, and a customer care user manager 148. In yet another example, the billing access enabling information 136 may include a billing user identity 150, a billing user name 152, and a billing user zip code 154.

An identity data store 156 stores aggregated access enabling information. While FIG. 1 depicts the identity data store 156 as external to the first and second enterprise networks 104 and 106, the first and/or second enterprise networks 104 and 106 may include the identity data store 156. The identity data store 156 may store required types of sales access enabling information 132 to enable the first sales application users 114 to access the second sales application 120. The required types of sales access enabling information 132 may include the sales user identity 138, the sales user name 140, and the sales user contact 140. The identity data store 156 may store the sales user identity 138 as a user identity 158, the sales user name 140 as a user name 160, and the sales user contact 142 as a user contact 162.

The identity data store 156 may store the required types of customer care access enabling information 134 to enable the first customer care application users 116 to access the second customer care application 122. The required types of customer care access enabling information 134 may include the customer care user identity 144, the customer care user name 146, and the customer care user manager 148. The customer care user identity 144 may be the same as the sales user identity 138, which the identity data store 156 may store as the user identity 158. The customer care user name 146 may be the same as the sales user name 140, which the identity data store 156 may store as the user name 160. However, the customer care user manager 148 may be a different type of access enabling information from the sales user contact 142, which the identity data store 156 may store as the user contact 162. Therefore, the identity data store 156 may store the customer care user manager 148 as a user manager 164.

The identity data store 156 may store the required types of billing access enabling information 136 to enable the first billing application users 118 to access the second billing application 124. The required types of billing access enabling information 136 may include the billing user identity 150, the billing user name 152, and the billing user zip code 154. The billing user identity 150 may be the same as the sales user identity 138, which the identity data store 156 may store as the user identity 158. The billing user name 152 may be the same as the sales user name 140, which the identity data store 156 may store as the user name 160. However, the billing user zip code 154 may be a different type of access enabling information from the sales user contact 142, which the identity data store 156 may store as the user contact 162. Additionally, the billing user zip code 154 may be a different type of access enabling information from the customer care user manager 148, which the identity data store 156 may store as the user manager 164. Therefore, the identity data store 156 may store the billing user zip code 154 as a user zip code 166.

The identity data store 156 may include each type of access enabling information required for users on the first enterprise network 104 to access applications on the second enterprise network 106. When users on the first enterprise network 104 access applications on the second enterprise network 106, an identity users' history 168 may store the history of this access. A second users' history 170 in a second data store 172 in the second enterprise network 106 may store the history for users on the second enterprise network 106 accessing applications on the second enterprise network 106. Similarly, a first users' history 174 in a first data store 176 in the first enterprise network 104 may store the history for users on the first enterprise network 104 accessing applications on the first enterprise network 104.

Figure 2:
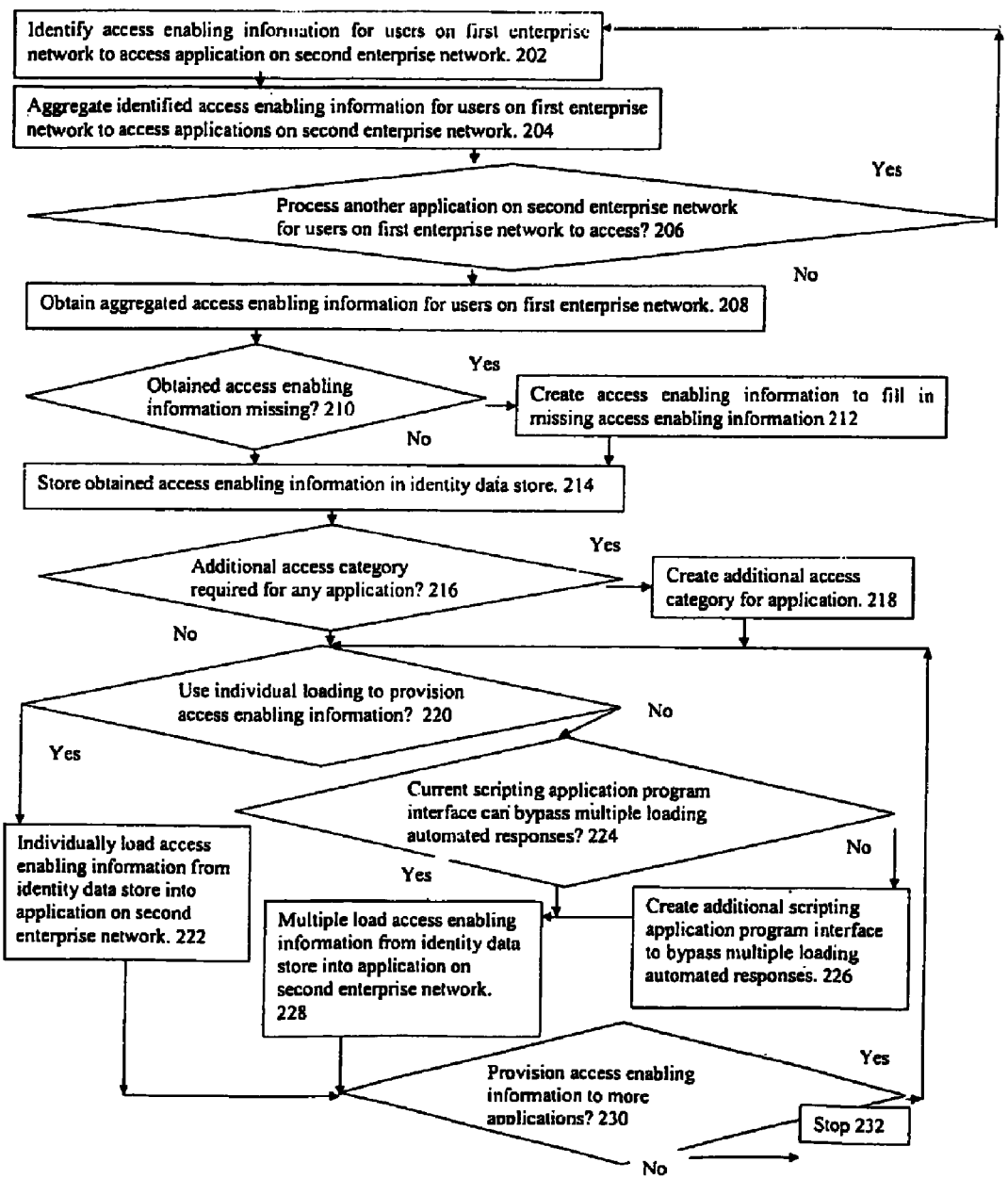
FIG. 2 is a flowchart of a method of identity management for application access by day zero according to an embodiment of the present disclosure.

Day zero is a scheduled date for users of the first enterprise network 104 to access applications on the second enterprise network 106, and/or vice versa. Turning now to FIG. 2, a flow chart depicts a method of identity management for application access by day zero according to an embodiment of the present disclosure. When this method completes, users on the first enterprise network 104 may access applications on the second enterprise network 106.

In box 202, the information manager 102 identifies access enabling information for users on the first enterprise network 104 to access an application on the second enterprise network 106. For example, the information manager 102 may identify the customer care user identity 144, the customer care user name 146, and the customer care user manager 148 as the customer care access enabling information 134. This customer care access enabling information 134 may enable users on the first enterprise network 104 to access the second customer care application 122 on the second enterprise network 106.

In box 204, the information manager 102 aggregates the identified access enabling information for users on the first enterprise network 104 to access the applications on the second enterprise network 106. For example, the information manager 102 may determine that the customer care user identity 144 may be the same as the sales user identity 138, which the identity data store 156 may store as the user identity 158. The information manager 102 may also determine that the customer care user name 146 may be the same as the sales user name 140, which the identity data store 156 may store as the user name 160. However, the information manager 102 may determine that the customer care user manager 148 may be a different type of access enabling information from the sales user contact 142, which the identity data store 156 may store as the user contact 162. Therefore, the information manager 102 may store the customer care user manager 148 as the user manager 164.

In box 206, the information manager 102 determines whether to process user information to enable access to another application on the second enterprise network 106 by users of the first enterprise network 104. In response to a determination to process another application on the second enterprise network 106, the method returns to box 202. For example, the information manager 102 may determine to enable access to the second billing application 124 on the second enterprise network 106 for users on the first enterprise network 104. In response to a determination to not process another application on the second enterprise network 106, the method proceeds to box 208. For example, after processing the second billing application 124, the information manager 102 may determine that there is no other user information to process.

In box 208, the information manager 102 obtains the aggregated access enabling information for users on the first enterprise network 104 to enable access to applications on the second enterprise network 106. For example, the aggregated access enabling information may include the user identity 158, the user name 160, the user contact 162, the user manager 164, and the user zip code 166. The information manager 102 may obtain each of these types of access enabling information for each user on the first enterprise network 104. The access enabling information may also specify those applications that each user accesses on the first enterprise network 104, which may be the basis for determining the applications each user needs access to on the second enterprise network 106. For example, the information manager 102 may enable a user who is one of the first sales application users 114, who access the first sales application 108 on the first network 104 to access the second sales application 120 on the second network 106.

In box 210, the information manager 102 determines whether any obtained access enabling information is missing. In response to a determination that obtained access enabling information is missing, the method proceeds to box 212. For example, the information manager 102 may determine that the user identity 158 is missing from the obtained access enabling information for users on the first enterprise network 104. In response to a determination that no obtained access enabling information is missing, the method proceeds to box 214.

In box 212, the information manager 102 creates access enabling information to fill in the missing access enabling information. For example, the user identity 158 may be missing from the obtained access enabling information for users on the first enterprise network 104. This information may be missing because the user identity 158 may be the social security number for a user, information that the first enterprise network 104 may not have for any user. If the second sales application 120 requires that a nine digit number be stored in the sales user identity 138 as sales access enabling information 132, the information manager 102 may create a different nine digit number for each user on the first enterprise network 104. This created number may begin with "999" to insure that the created number does not match the sales user identity 138 for any user on the second enterprise network 106. This created number may also provide information that enables easy differentiation between users on the first enterprise network 104 and users on the second enterprise network 106.

In box 214, the information manager 102 stores the obtained access enabling information in the identity data store 156. For example, the information manager 102 may store the user identity 158, the user name 160, the user contact 162, the user manager 164, and the user zip code 166 for each user on the first enterprise network 104. Each type of access enabling information may be either obtained from the first enterprise network 104 or created by the information manager 102.

In box 216, the information manager 102 determines whether an additional access category is required for any application. In response to a determination that an additional access category is required for any application, the method proceeds to box 218. For example, two categories may be used for the first billing application users 118, while only one category may be used for the second billing applications users 130. This may create a need for another category in the second billing application 124. In response to a determination that an additional access category is not required for any application, the method proceeds to box 220.

In box 218, the information manager 102 creates an additional access category for an application. For example, the first billing application users 118 may include restricted users and unrestricted users in contrast to the second billing application users 130, which may include only unrestricted users. In such a situation, the information manager 102 may create an additional access category of restricted users and store this in the second billing application 124. Creating this additional access category enables the continued differentiation of users established for the first billing application users 118.

In box 220, the information manager 102 determines whether to use individual loading to provision the access enabling information. An individual load is the movement of access enabling information for only one user. Such a determination may be based upon the amount of access enabling information to load and the availability of resources for loading the access enabling information. In response to a determination to use individual loading to provision the access enabling information, the method proceeds to box 222. For example, the information manager 102 may provide access for less than two hundred users on the first enterprise network 104 to the second billing application 124, and the individuals who manually enter access enabling information for the second billing application 124 may be available. In response to a determination to not use individual loading to provision the access enabling information, the method proceeds to box 224. For example, the information manager 102 may provide access for four thousand users on the first enterprise network 104 to the second customer care application 122, and the application program interface that automatically enters access enabling information for the second customer care application 122 may be available. Application program interfaces are well know, for example, and may include a sequence of instructions that enable computer applications and software to communicate and interconnect with other computer applications and software.

In box 222, the information manager 102 individually loads the access enabling information from the identity data store 156 into an application on the second enterprise network 106. For example, the information manager 102 may provide access enabling information for the one hundred users of the first billing application users 118 to the individuals who manually enter access enabling information for the second billing application 124. Then the method proceeds to box 230.

In box 224, the information manager 102 determines whether the current scripting application program interface can bypass the multiple loading automated responses for the application. This determination is based on the manner in which the current scripting application program interface is coded. A multiple load is the movement of access enabling information for more than one user. An automated response is the provision of a resource, such as a cubicle assignment or a telephone number, without the intervention of people. Some automated responses may respond to the multiple loading of access enabling information for users by providing inappropriate resources for users who are not new employees of the second enterprise network. In response to a determination that the current scripting application program interface cannot bypass the multiple loading automated responses for the application, the method proceeds to box 226. In response to a determination that the current scripting application program interface can bypass the multiple loading automated responses for the application, the method proceeds to box 228.

In box 226, the information manager 102 creates an additional scripting application program interface to bypass the multiple loading automated responses for the application. The created scripting application program interface may differ from the current scripting application program interface only by the capability to bypass the multiple loading automated responses for the application. Additionally, the information manager 102 may create an additional scripting application program interface to bypass the multiple loading automated responses for the application if no scripting application program interface exists for the application. This may be useful in cases, for example, when the individuals that manually enter access enabling information for the second billing application 124 may not be available at that time. In another example, the second sales application 120 may lack a scripting application program interface because the normal loading of access enabling information is for less than two hundred users. Lacking a scripting application program interface may be a problem if the information manager 102 loads access enabling information for four thousand users to the second sales application 120.

In box 228, the information manager 102 multiple loads the access enabling information from the identity data store 156 into an application on the second enterprise network 106 using a scripting application program interface for the application. For example, the information manager 102 may provide access enabling information for four thousand users of the first customer care application users 116 to the application program interface that automatically enters access enabling information for the second customer care application 122.

In box 230, the information manager 102 determines whether to provision access enabling information to more applications. For example, the information manager 102 may complete provisioning for the second customer care application 122 and reference access enabling information to provision to the second billing application 124. In response to a determination to provision access enabling information to more applications, the method returns to box 220. If no other information needs to be processed, the method proceeds to box 232. In box 232, the information manager 102 stops the method. At this point, users on the first enterprise network 104 may access applications on the second enterprise network 106.

Figure 3:
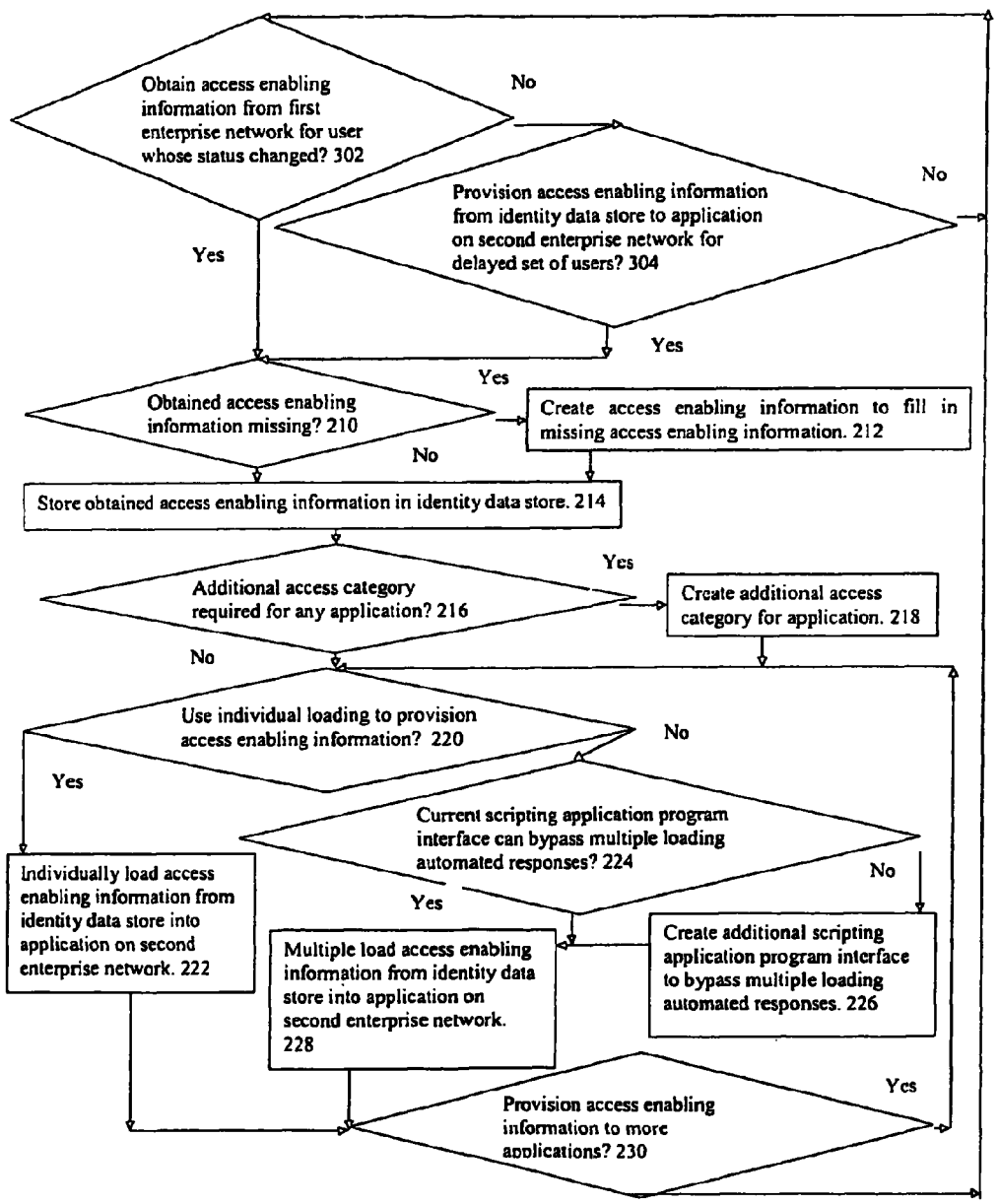
FIG. 3 is a flowchart of a method of identity management for application access after day zero according to an embodiment of the present disclosure.

Turning now to FIG. 3, a flow chart depicts a method of identity management for application access after day zero according to an embodiment of the present disclosure. The information manager 102 may enable users on the first enterprise network 104 to access applications on the second enterprise network 106 either by day zero or after day zero.

In box 302, the information manager 102 determines if the second enterprise network 106 obtains access enabling information from the first enterprise network 104 for a user whose status changed. A user whose status changed is a user whose access to applications changed. For example, one user of the first sales application users 114, whose only access on the second enterprise network 106 is to the second sales application 120, may have a status change that entitles the user to access the second customer care application 122. In response to a determination that the second enterprise network 106 does not obtain access enabling information from the first enterprise network 104 for a user whose status changed, the method proceeds to box 304. In response to a determination that the second enterprise network 106 obtains access enabling information from the first enterprise network 104 for a user whose status changed, the method proceeds to box 210 to provision the access enabling information. Because the provisioning method described in boxes 210 to 230 in FIG. 2 is substantially similar to the provisioning method for a user whose status changed, FIG. 3 depicts the provisioning method using boxes 210 to 230. For the sake of brevity, the description of the provisioning method for FIG. 3 is an overview, not the detailed description provided for FIG. 2.

In box 304, the information manager 102 determines whether to provision access enabling information from the identity data store 156 to an application on the second enterprise network 106 for a delayed set of users. A delayed set of users is a set of users on the first enterprise network 104 who do not have access to applications on the second enterprise network 106 by day zero. However, the delayed set of users may have access to applications on the second enterprise network 106 after day zero. For example, a delayed set of users in the first sales application users 114 may have access to the first sales application 108, but by day zero this delayed set of users may lack sufficient training to access the second sales application 120. The information manager 102 may schedule the delayed set of users to access the second sales application 120 on day sixty, for example, when the delayed set of users complete sufficient training to access the second sales application 120. A delayed set of users may be scheduled to access the second sales application on any day after day zero. In response to a determination not to provision access enabling information from the identity data store 156 to an application on the second enterprise network 106 for a delayed set of users, the method returns to box 302. By periodically checking in box 302 for a user whose status changes and periodically checking in box 304 for provisioning for a delayed set of users, the information manager 102 continues to provision access enabling information as needed after day zero. In response to a determination to provision access enabling information from the identity data store 156 to an application on the second enterprise network 106 for a delayed set of users, the method proceeds to box 210. Because the provisioning method described in boxes 210 to 230 in FIG. 2 is substantially similar to the provisioning method for a delayed set of users, FIG. 3 depicts the provisioning method using boxes 210 to 230. For clarity, boxes 210 to 230 will be briefly reviewed, although these boxes are substantially similar to boxes 210 to 230 in FIG. 2.

In box 210, the information manager 102 determines whether any obtained access enabling information is missing. In response to a determination that obtained access enabling information is missing, the method proceeds to box 212. In response to a determination that obtained access enabling information is not missing, the method proceeds to box 214.

In box 212, the information manager 102 creates access enabling information to fill in for the missing access enabling information. In box 214, the information manager 102 stores the obtained access enabling information in the identity data store 156.

In box 216, the information manager 102 determines whether an additional access category is required for any application. In response to a determination that an additional access category is required for any application, the method proceeds to box 218. In response to a determination that an additional access category is not required for any application, the method proceeds to box 220. In box 218, the information manager 102 creates an additional access category for an application.

In box 220, the information manager 102 determines whether to use individual loading to provision the access enabling information. In response to a determination to use individual loading to provision the access enabling information, the method proceeds to box 222. In response to a determination to not use individual loading to provision the access enabling information, the method proceeds to box 224.

In box 222, the information manager 102 individually loads the access enabling information from the identity data store 156 into an application on the second enterprise network 106. Then the method proceeds to box 230.

In box 224, the information manager 102 determines whether the current scripting application program interface can bypass the multiple loading automated responses for the application. In response to a determination that the current scripting application program interface cannot bypass the multiple loading automated responses for the application, the method proceeds to box 226. In response to a determination that the current scripting application program interface can bypass the multiple loading automated responses for the application, the method proceeds to box 228.

In box 226, the information manager 102 creates an additional scripting application program interface to bypass the multiple loading automated responses for the application. In box 228, the information manager 102 multiple loads the access enabling information from the identity data store 156 into an application on the second enterprise network 106 using a scripting application program interface for the application.

In box 230, the information manager 102 determines whether to provision access enabling information to more applications. In response to a determination to provision access enabling information to more applications, the method returns to box 220. In response to a determination to provision access enabling information to no more applications, the method returns to box 302 to restart checking for a user whose status changed and checking for a delayed set of users. The method returning to box 302 from box 230 is a contrast to FIG. 2, where the method stops in response to a determination to provision access enabling information to no more applications. This contrast is because FIG. 2 depicts a method that generally executes only once in preparation for day zero. However, FIG. 3 depicts a method that periodically executes on multiple instances after day zero, as the information manager 102 executes the method as needed based on users whose status changed and delayed sets of users.

Figure 4:
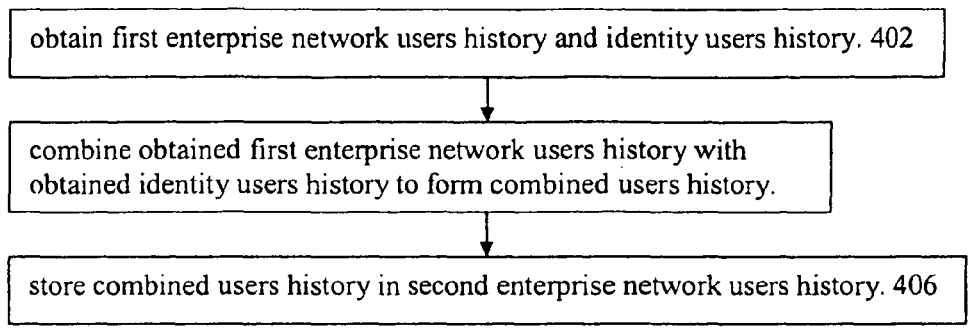
FIG. 4 is a flowchart of a method of identity management for application access to combine histories according to an embodiment of the present disclosure.

Turning now to FIG. 4, a flow chart depicts a method of identity management for application access to combine histories according to an embodiment of the present disclosure. If the second enterprise network 106 and the first enterprise network 104 merge, the second enterprise network 106 may schedule the information manager 102 to combine the user histories for the second enterprise network 106 and the first enterprise network 104. The information manager 102 may combine the identity users' history 168 and the first users' history 174 and store this combined result to the second users' history 170. Storing the combined result enables the history for users on the first enterprise network 104 and the history for users on the second enterprise network 106 to be aggregated together in the second users' history 170. The second users' history 170 may include all subsequent history stored for users on the first enterprise network 104 and users on the second enterprise network 106.

In box 402, the information manager 102 obtains the first users' history 174 and obtains the identity users' history 168. In box 404, the information manager 102 combines the obtained first users' history 174 with the obtained identity users' history 168 to form a combined users' history. In box 406, the information manager 102 stores the combined users' history in the second users' history 170. In this way, each user's history is maintained and available during and after integration of the first and second enterprise networks 104 and 106.

Figure 5:
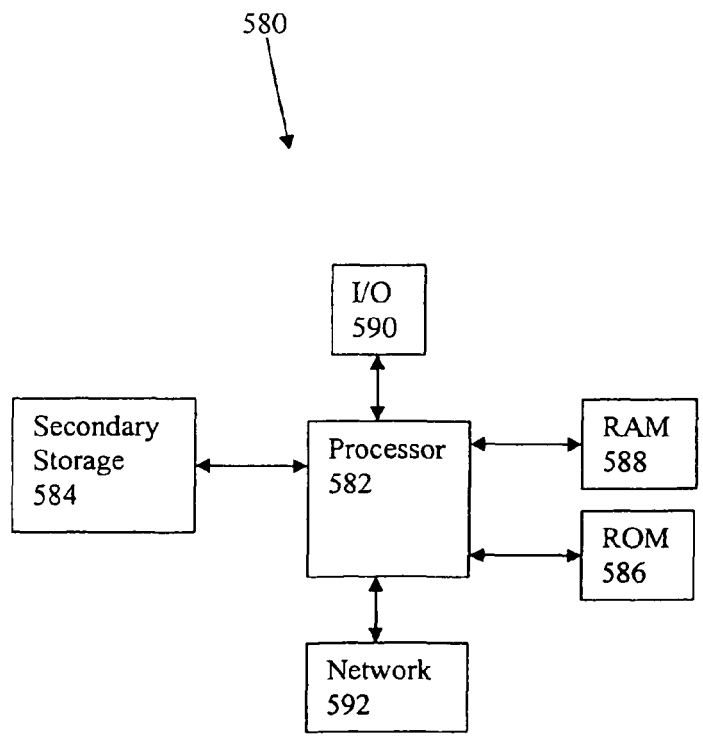
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method of identity management for application access, comprising:
   identifying types of access enabling information needed for users of applications on a first enterprise network to access applications on a second enterprise network, wherein the first enterprise network is being integrated with the second enterprise network, wherein identifying the types of access enabling information for the users of the applications on the first enterprise network to access the applications on the second enterprise network comprises aggregating the types of access enabling information from each of the applications on the second enterprise network, and wherein the types of access enabling information needed to access a first application of the applications on the second enterprise network is different from the types of access enabling information needed to access a second application of the applications on the second enterprise network;
   obtaining access enabling information for each of the identified types of access enabling information for the users in a one-time collection from the first enterprise network;
   storing the access enabling information in an identity data store; and
   provisioning the access enabling information from the identity data store to one or more applications on the second enterprise network to enable the users of the applications on the first enterprise network to access the one or more applications on the second enterprise network.

2. The computer implemented method of claim 1, further comprising bypassing an automated response on the second enterprise network when provisioning the access enabling information from the identity data store to the one or more applications on the second enterprise network.

3. The computer implemented method of claim 1, wherein provisioning the access enabling information from the identity data store to the one or more applications on the second enterprise network includes multiple loading the access enabling information from the identity data store to the one or more applications on the second enterprise network.

4. The computer implemented method of claim 3, wherein multiple loading the access enabling information from the identity data store to the one or more applications on the second enterprise network uses a scripting application program interface, the scripting application program interface operable to bypass an automated response for the multiple loading.

5. The computer implemented method of claim 1, further comprising:
   obtaining aggregated access enabling information from the first enterprise network for a user whose status changed.

6. The computer implemented method of claim 1, wherein provisioning the access enabling information from the identity data store to the one or more applications on the second enterprise network is delayed for a delayed set of users for the one or more applications on the second enterprise network.

7. The computer implemented method of claim 1, further comprising:
   for the types of access enabling information, creating an access category for the one or more of the applications on the second enterprise network.

8. A system of identity management for application access, comprising:
   a first enterprise network having a plurality of applications;
   a second enterprise network having a plurality of applications, wherein the first enterprise network is being integrated with the second enterprise network;
   an identity data store;
   an information manager operable to obtain in a one-time collection access enabling information for each type of access enabling information needed for a plurality of users of the plurality of applications on the first enterprise network to access the plurality of applications on the second enterprise network,
   the information manager further operable to store the access enabling information in the identity data store, and promote provisioning the access enabling information from the identity data store to at least some of the applications on the second enterprise network to enable each of the plurality of users of the plurality of applications on the first enterprise network to access the at least some applications on the second enterprise network, wherein the information manager is further operable to multiple load the access enabling information from the identity data store to the at least some applications on the second enterprise network.

9. The system of claim 8, further comprising:
   a bypass component operable to bypass an automated response on the second enterprise network when provisioning the access enabling information from the identity data store to the at least some applications on the second enterprise network.

10. The system of claim 9, wherein the information manager is further operable for individually loading the access enabling information from the identity data store to the applications.

11. The system of claim 9, wherein the information manager is further operable for creating access enabling information.

12. The system of claim 9, wherein the identity data store is further defined as a data store associated with one of the first and second enterprise networks.

13. The system of claim 9, wherein the information manager is further operable to delay provisioning the access enabling information from the identity data store to the at least some applications on the second enterprise network to provide access for a delayed set of users for the at least some applications on the second enterprise network.

14. The system of claim 9, wherein the information manager is further operable to create an access category for the at least some applications on the second enterprise network.

15. The system of claim 8, wherein the information manager uses a scripting application program interface to multiple load the access enabling information from the identity data store to the at least some applications on the second enterprise network.

16. The system of claim 15, wherein the information manager is further operable to create an additional scripting application program interface when a current scripting application program cannot bypass the automated response for the multiple load.

17. A computer implemented method of identity management for application access, comprising:
- identifying types of access enabling information needed for users of applications on a first enterprise network to access applications on a second enterprise network, wherein the first enterprise network is being integrated with the second enterprise network;
- obtaining access enabling information for each of the identified types of access enabling information for the users in a one-time collection from the first enterprise network;
- storing the obtained access enabling information in an identity data store;
- provisioning the access enabling information from the identity data store to one or more applications on the second enterprise network to provide access for the users of the applications on the first enterprise network to the one or more applications on the second enterprise network, wherein provisioning the access enabling information from the identity data store to the one or more applications on the second enterprise network includes multiple loading the access enabling information from the identity data store to the one or more applications on the second enterprise network;
- obtaining a usage history of the applications on the first enterprise network for each of the users from a first enterprise network data store;
- obtaining a usage history of the applications on the second enterprise network for each of the users from the identity data store;
- combining the obtained usage history of the applications on the first enterprise network for each of the users from the first enterprise network data store with the obtained usage history of the applications on the second enterprise network for each of the users from the identity data store to form a combined usage history for each of the users; and
- storing the combined usage history for each of the users in a second enterprise network data store.

18. The computer implemented method of claim 1 wherein subsequent to the provisioning, the users of the applications on the first enterprise network are able to directly access the applications on the second enterprise network.

* * * * *